United States Patent
Fahey, Jr.

[11] 3,810,649
[45] May 14, 1974

[54] ARTICLE TRANSPORT MEANS

[76] Inventor: John J. Fahey, Jr., 351 E. Thomas Rd., Apt. D203, Phoenix, Ariz. 85012

[22] Filed: Feb. 28, 1973

[21] Appl. No.: 336,535

[52] U.S. Cl. .................................. 280/37, 280/38
[51] Int. Cl. ............................................. A45c 5/14
[58] Field of Search .............. 280/37, 38, 39, 43.24

[56] References Cited
UNITED STATES PATENTS
| | | | |
|---|---|---|---|
| 3,413,011 | 11/1968 | Weitzner | 280/37 |
| 2,917,317 | 12/1959 | Denholm | 280/43.24 |
| 3,057,636 | 10/1962 | D'Ettorre | 280/37 |

FOREIGN PATENTS OR APPLICATIONS
| | | | |
|---|---|---|---|
| 1,438,733 | 4/1966 | France | 280/37 |

*Primary Examiner*—Robert R. Song

[57] ABSTRACT

An article transport means adapted to carry the weight of various articles such as heavy luggage cases or appliances while such articles are manually moved along a surface such as a floor or the like from one place to another. The transport means having a housing provided with a bottom and a side at the juncture of which a hinge hingedly supports a roller carriage plate which is adapted to move from a normally vertical position at the side of the housing to a horizontal position beneath the bottom of the housing so that rollers rotatably mounted on the rotor carriage plate may be carried inside the housing in a compartment therein and may alternately be pivoted about the hinge to be disposed beneath the housing so that the peripheries of the rollers may support the housing on a horizontal or other surface such as a floor; a flexible endless belt means is positioned over the rollers so that they may be operated in unison and operate quietly as well as to provide extended traction for the rollers to support the housing and to assist in static balancing thereof when manually transported by handle or other means preferably on the top of the housing.

7 Claims, 3 Drawing Figures

ARTICLE TRANSPORT MEANS

BACKGROUND OF THE INVENTION

The prior art contains various transport means such as disclosed in the following U.S. Pat. Nos.: 1,028,178, 2,439,660, 2,456,932, 2,463,713, 2,510,754, 2,562,686, 2,596,578, 2,661,220, 2,917,317.

The foregoing U.S. Pats., variously disclose details of article transport means including such means used in connection with luggage cases or the like. Many of the foregoing patents disclose rollers projectable at the corners of luggage cases or other housings as well as from the bottom side thereof and various mechanisms are used to project and retract such rollers; however it has been noted that the foregoing prior art either includes complicated actuation or roller support mechanism or the aesthetic features of a luggage case thus equipped are somewhat compromised so that the prior art devices are either complicated or unsightly as they relate to luggage cases and/or other articles to which such devices may be adapted.

There has been a need for a very simple and easy to operate luggage case transport means which does not create an aesthetic compromise relative to a luggage case and which is capable of balancing and transporting a substantial amount of weight in a large luggage case with the operator simply pushing the luggage case along the surface of the floor or the like. In areas such as the luggage areas of air terminals, it has been recognized that considerable weight in a luggage case becomes almost impossible for some persons to handle assuming that they must carry the entire load in the luggage case as well as to transport it. Additionally the packing of luggage in airplanes or the like requires that the luggage is provided with a minimum of protruding or extendable articles which extend beyond the normal rectangular surfaces and corners of the luggage. Such is necessary so that efficient packing and unpacking of such luggage may be accomplished with the storage areas of the aircraft in which the luggage must be carried.

SUMMARY OF THE INVENTION

The present invention comprises a housing which may be anyone of a variety of housings including luggage cases, appliances, and other devices which from time to time need to be manually transported along the surfaces of floors or the like. The housing of the invention is provided with a compartment in one substantially vertical side on wall portion thereof, at a corner of the side and the bottom of the housing the compartment is provided with a roller carriage plate pivoted at a corner of the housing at the intersection of said side and bottom and the plate carries a plurality of rollers which may be pivoted substantially 90° about the hinge and into a position wherein the plate is contiguous with the bottom of the housing and wherein the rollers are directed downwardly so that the peripheries may engage a surface such as a floor or the like. When the plate is pivoted into closed position it encloses an opening in the side of the housing and the rollers are carried on the inner side of the plate while the outer side of the plate is substantially flush with the outer side of the housing.

A box like compartment surrounds the inner side of the plate and the rollers so as to isolate the rollers and the inner side of the plate from the remaining space internally of the housing which may include the space of a luggage case or other housing.

The compartment and opening in the side of the housing occupies only a small fraction of the overall space therein.

The roller carriage plate is provided with an outer side which is substantially flush with the outer side of the housing or the luggage case and encloses an opening in the side thereof such as to provide a very neat appearance and to avoid detracting from the aesthetic features of the luggage case or housing. Additionally, substantially all of the features of the article transport means of the invention are maintained within the overall dimensions of the housing or luggage case so as to permit unobstructed transportation thereof in the hold of an aircraft or other vehicle which is utilized to transport luggage or other housing devices.

The invention comprises a novel endless belt surrounding the rollers rotatably mounted on the roller carriage plate of the invention and the endless belts provide for traction as well as coordination of all of the plurality of rollers in connection with the roller carriage plate and the rollers are spaced apart sufficiently to provide balance of the housing or luggage case in two different directions so that a person moving the article transport means of the invention along the surface of the floor or the like need only to balance the housing slightly in accordance with the force supplied to move it along said floor.

The invention comprises very simple means for moving a plurality of support rollers on a roller carriage plate with one simple hinge which hingedly carries the plurality of rollers precisely from a storage position within the housing to a transport position at the bottom thereof, and the hinge axis of the roller carriage plate is normally horizontal when the housing is upright and the axes of the rollers are disposed generally at right angles to the hinge axis of the roller carriage plate so that pivotal movement of the plate about the hinge axis thereof for a distance of about 90° disposes the rollers below the bottom of the housing or luggage case in a support position therefor.

Accordingly, it is an object of the present invention to provide a very simple, useful and aesthetically neat article transport means for housing, such as luggage cases or the like.

Another object of the invention is to provide an article transport means for housings or luggage cases which is very simply and easily extended from a stowed position within the housing or luggage case to a supporting position therefor, and requires only one simple movement or pivotal operation of the roller carriage plate to move all of the rollers into a support position for transporting the housing or luggage case.

Further objects and advantages of the invention may be apparent from the following specification, appended claims and accompanying drawings.

BRIEF DESCRIPTION OF THE DRAWINGS

FIG. 1 is a fragmentary and elevational view of a housing such as a luggage case or the like, showing portions thereof broken away and in section, and showing the article transport means of the present invention in connection therewith, and illustrating by broken lines and arrows the movement of the roller carriage plate and transport rollers from a stowed position to an operative support position for the housing or luggage case;

FIG. 2 is a fragmentary side elevational view of the structure shown in FIG. 1 of the drawings, taken from the line 2—2 of FIG. 1, and showing by solid lines the disposition of the transport rollers of the invention in a supporting position below the bottom of the housing or lugage case, ready for transportation thereof on a surface such as a floor or the like; and FIG. 3 is an enlarged fragmentary sectional view taken from the line 3—3 of FIG. 2, showing an endless belt structure disposed on a roller rotatably mounted on the carriage plate of the invention and illustrating details of the hinge structure as well as the roller and belt structure.

DESCRIPTION OF THE PREFERRED EMBODIMENTS

Figures 1, 2, 3:
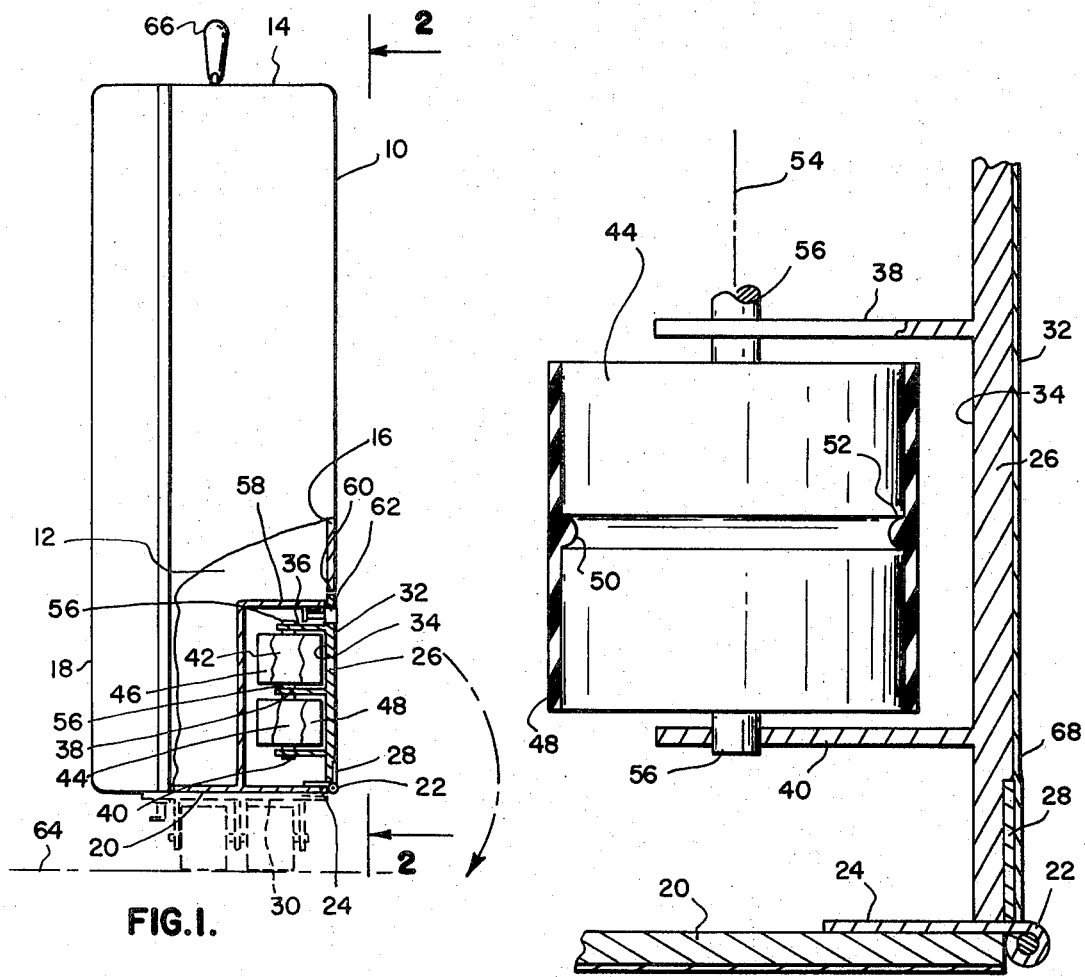

As shown in FIGS. 1 and 2 of the drawings, the invention comprises a housing 10 which may be a luggage case or any other housing such as the housing of a heavy appliance or the like. This housing 10 is hollow and provided with a substantial amount of space on the interior 12 thereof.

The housing is provided with a top 14, opposite sides 16 and 18, and ends 21 and 23, all of which constitute wall portions.

By way of example only the hinge 22 is located at the corner juncture of the bottom 20 and the side 16, and the hinge is secured at 24 to the bottom 20 and a roller carriage plate 26 in secured at 28 to the hinge 22 so that the plate 26 may be pivoted to a broken line position 30 shown in FIGS. 1 and 3 of the drawings. It will be obvious that the hinge may be at the juncture of a side and end of the housing.

The plate 26 is provided with a first or outer side 32 and a second or inner side 34.

Carried by the inner side 34 are bearing supports 36, 38, and 40, carrying a plurality of rollers 42 and 44, each plurality being substantially as shown in FIG. 2 of the drawings, wherein the plurality 44 may comprise as many as six rollers or more, or may comprise less, depending upon the desire for support of the housing 10 in accordance with its size and weight. Thus, there may be a substantial number of rollers, the pluralities 42 and 44 being spaced laterally to provide lateral balance of the housing 10 while the longitudinal spacing of the plurality of rollers 44, as shown in FIG. 2, provides for longitudinal spacing of the plurality of rollers 44, as shown in FIG. 2, provides for longitudinal stability of the housing 10 when supported on the rollers.

Surrounding the plurality of rollers 42 is a belt 46, and surrounding the plurality of rollers 44 is a belt 48.

The belt 48 is shown in both FIGS. 2 and 3 of the drawings, and as shown in detail in FIG. 3 of the drawings, the belt 48 is provided with an inwardly directed rib 50 which engages grooves 52 in each of the rollers 44 so that the rib 50 prevents the movement of the endless belt 48 in a direction parallel to the axis 54 of the rollers 44.

The rollers 44 are provided with axies 56 disposed along said axis 54, and these axies are rotatably mounted in the supports 36, 38, and 40, all as shown best in FIGS. 1 and 3 of the drawings.

It will be seen that there are a plurality of the axies 56 which may extend through all of the supports 36, 38, and 40, and through the plurality of rollers 42, as well as the plurality of rollers 44.

A generally box-shaped compartment 58 is substantially coextensive with an opening 60 in the side of the housing 10 and the roller carriage plate 32 encloses this opening and holds the rollers and belts inside the compartment 58 which isolates the rollers and belts from the remaining space 12 in the housing or luggage case, to which the invention is adapted.

The box-shaped compartment 58 thus provides a storage enclosure for the rollers and the belts and isolates them from the remaining space 12 which may contain clothing or other articles.

A simple tumbler lock 62 in connection with the roller carriage plate is adapted to lock or unlock the plate 26 so that it may be held in closed position or may readily be moved into the broken line position as shown at 30 in FIG. 1 of the drawings.

The belt 48 over the rollers 42 and 44 is adapted to bear upon a floor surface 64 as shown in FIGS. 1 and 2 of the drawings, and a handle 66 on the upper part of the housing may serve as a handle for transporting the housing on the rollers and belts of the invention in engagement with the floor surface 64.

In operation, the invention serves to support heavily laden luggage cases or the housings of appliances or the like, and the roller carriage plate, having a plurality of rollers on a single plate and movable on a single hinge, provides for great simplicity in the disposition of the rollers from a stowed position within the housing to its supporting position as indicated by broken lines 30 in FIG. 1 of the drawings.

When the roller carriage plate is closed relative to the opening 60 in the side 16 of the housing 10, all surfaces are substantially flush, the roller carriage plate being substantially flush with the side 16 of the housing 10, and due to the fact that no protruding parts are existent, the packing of the invention, such as a luggage case structure, with other similar cases is particlarly simple and is very important in areas such as the luggage rooms of aircraft or the like.

The flush relationship of the roller carriage plate relative to the side 16 of the housing 10 provides for neat, aesthetic configuration of the overall housing, and this is particularly important when it happens to be a luggage case normally used by persons traveling in public.

The outer side of the plate 26, as shown in FIG. 3, is provided with a suitable finish covering 68 which overlaps the hinge portion 28 of the hinge 22 and this covering 68, as shown on enlarged scale in FIG. 3 of the drawings, may have a comparable counterpart in continuity extending over the outer sides and surface areas of the housing 10.

If desired the hinge 22 may be at a corner of the housing which forms a juncture of a side and an end of the housing.

It will be obvious to those skilled in the art that various modifications may be resorted to without departing from the spirit of the invention.

I claim:

1. In an article transport means the combination of: a housing having a top, a bottom, and a pair of opposite sides and a pair of opposite ends: said top, bottom, sides and ends each constituting a wall portion; said housing having corner portion disposed at a juncture of a pair of said wall portions; a hinge coupled to said pair of wall portions at said corner; said housing having an opening in a first one of said wall portions thereof, said opening extending over only a portion of said first one of said wall portions; a roller carriage plate enclosing said opening in said first wall portion; an edge of said plate connected to said hinge; said hinge having a pivotal axis normally disposed in a horizontal direction; said roller carriage plate having a first side facing in the same direction as said first one of said wall portions of said housing; said roller carriage having a second side facing toward the interior of said housing; a plurality of rollers having peripheries, said rollers rotatably mounted on said second side of said roller carriage plate; said rollers having axes of rotation which are disposed substantially parallel to said second side of said roller carriage plate; whereby said roller carriage plate may be pivoted substantially 270 degrees about the axis of said hinge to dispose said first side of said plate into adjacent disposition with a second one of said wall portions of said housing, said to dispose said second side of said plate facing downwardly and to dispose said rollers and their axes of rotation horizontally so as to permit said peripheries of said rollers to portably support said housing on a surface such as a floor.

2. The invention as defined in claim 1, wherein: an endless belt surrounds said plurality of rollers and affords a tractive surface for engagement with a floor or other similar surface.

3. The invention as defined in claim 1, wherein: said first side of said plate is substantially flush with said one of said opposite sides of said housing.

4. The invention as defined in claim 1, wherein: said housing is a luggage case; and a generally box shaped compartment structure therein substantially coextensive with said opening in said one of said opposite sides of said housing; said compartment structure disposed to displace only a fraction of the interior space in said luggage case; said compartment structure disposed to enclose said rollers and said second side of said roller carriage plate so as to separate the same from the remaining space in said luggage case.

5. The invention as defined in claim 1, wherein: said plurality of rollers are spaced apart on said roller carriage plate so as to balance said housing when resting on said rollers.

6. The invention as defined in claim 2, wherein: said rollers are provided with peripheral grooves; said endless belt having an endless protruding rib disposed in said grooves of said rollers to prevent said belt from shifting off said rollers in a direction parallel to said axes of rotation thereof.

7. The invention as defined in claim 4 wherein: said housing is provided with a handle on said top thereof for moving said luggage case and manually transporting it while said rollers support the weight thereof on said surface.

* * * * *